Figure 1:
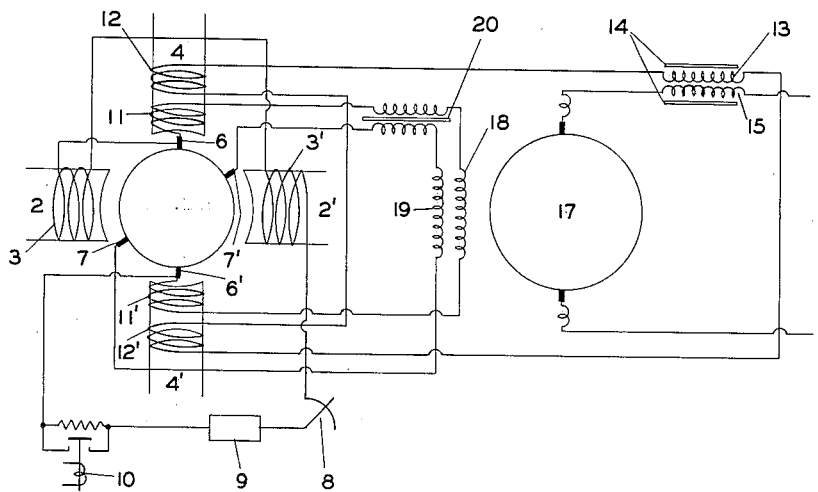

Dec. 9, 1952     R. P. L. M. DAVID     2,621,320

DIRECT CURRENT EXCITER-GENERATOR

Original Filed July 25, 1945

INVENTOR

*Roland Pierre Leopold Marie David*

BY *Cameron, Kerkam & Sutton*

ATTORNEYS

Patented Dec. 9, 1952

2,621,320

UNITED STATES PATENT OFFICE 2,621,320

DIRECT CURRENT EXCITER-GENERATOR

Roland Pierre Léopold Marie David, Paris, France, assignor to Le Materiel Electrique S. W., Paris, France, a joint-stock company of France Original application July 25, 1945, Serial No. 607,063. Divided and this application June 8, 1950, Serial No. 166,874. In France July 8, 1943

Section 1, Public Law 690, August 8, 1946
Patent expires July 8, 1963

9 Claims. (Cl. 322—19)

The present application is a division of my application Serial Number 607,063, filed July 25, 1945, now Patent No. 2,582,531, and has for its object novel direct current exciter-generators.

Generators are known, which can be utilized as exciters for a main machine and which, between their main field poles, include an even number of supplementary poles carrying a winding traversed by the current delivered by the generator and which have on the commutator one or more auxiliary brushes of adjustable position lying between the main brushes, these auxiliary brush or brushes being connected only to one of the field windings carried by the main poles of the generator. The auxiliary brushes introduce stepped-up or stepped-down electromotive force into the main field windings created by the flux engendered by the magnetomotive force produced by the winding on the supplementary poles in addition to the magnetomotive force which is required for compensating the armature reaction due to the current delivered by said generator.

The novel exciter-generators of the present invention differ from the aforesaid generators in that the auxiliary brush or brushes are connected to one of the main field circuits not of the exciter, but of the machine excited by the latter. This main field circuit, in the case of a single auxiliary brush, is connected to one of the main brushes of the exciter-generator. The mutual induction between this field circuit and the other field circuits of the excited machine is compensated in known manner by means of a negative mutual inductance.

The generators which are described and claimed in my copending application Serial No. 607,063 have supplementary poles which, in addition to the winding traversed by the current delivered by the generator itself, carry one or more additional windings fed by one or more appropriate external sources. One of these windings may be fed by current supplied by the secondary winding of an air-gap transformer, the primary winding of which is traversed by the variable current delivered by the generator itself.

The novel exciter-generators of the present invention may include similar means and its supplementary poles may carry one or more additional windings fed by one or more appropriate sources, one of which may be the secondary winding of an airgap transformer, the primary winding of which is traversed by the variable current delivered, not by the exciter, but by the main machine.

In another embodiment of the present invention, the additional windings, instead of being carried by the supplementary poles which carry the winding which is traversed by the current delivered by the exciter-generator, are carried by one or more pole pairs which are distinct from the supplementary poles which act only as commutating poles. The auxiliary brushes and the main brushes may be combined two by two, so that each of these combined brushes then has the two connections which the auxiliary and the main brushes had when they were separate, namely with the main field windings of both these machines.

In the accompanying drawings, in which like reference characters indicate like parts: Fig. 1 shows diagrammatically, an embodiment of the novel exciter-generators of the present invention combined with an air-gap transformer as briefly described above; and Fig. 2 is a modification of the embodiment of Fig. 1.

In Fig. 1, 1 is the armature of the exciter-generator, which is a normal armature with a two-pole winding, and 2, 2' are its main field poles, which are provided with the usual shunt field winding 3, 3'. Two supplementary poles 4, 4' carry an appropriate cross winding 11, 11' which is traversed by the current delivered by the exciter-generator which also feeds a main field winding 18 of a main direct current machine having an armature 17.

According to the present invention two auxiliary brushes 7, 7' are located on the commutator of the exciter-generator between the main brushes 6, 6'. The position of brushes 7, 7' may be adjustable and they are connected to a second field winding 19 of the main machine, so that the latter is excited by the current picked up on the commutator by the main brushes 6, 6' as well as by the current picked up by the auxiliary brushes 7, 7', which current results mainly from the flux emitted by the supplementary poles 4, 4'. Mutual induction between these two field circuits is compensated for in known manner by means of negative mutual inductance 20.

In accordance with another feature of the present invention, the supplementary poles 4, 4' of the exciter-generator may carry an additional winding 12, 12', fed by the secondary winding 13 of an air-gap transformer 14, the primary winding 15 of which is traversed by the variable current delivered by the main direct current machine.

As has been described in the aforementioned application Serial No. 607,063, each variation in the current delivered by said main machine has a corresponding correlative variation in the current which traverses the winding 12—12' and the consequent introduction in the axis of the supplementary poles 4, 4', of a flux which will provide the desired result.

In the embodiment shown in Fig. 1, the exciter-generator is provided with two auxiliary brushes. In view of the disclosure of my copending application Serial No. 607,063, if the exciter-generator is provided with a single auxiliary brush, this brush should be connected to one end of the field winding 19 of the main machine, and the other end of winding 19 should be connected to one of the main brushes or to a main terminal of said exciter-generator.

Figure 2:
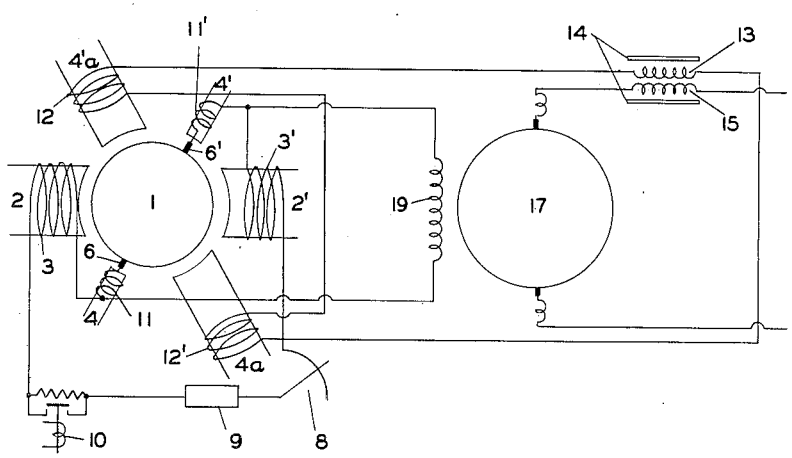

In the modification shown in Fig. 2, the exciter-generator comprises a normal armature 1 having a bipolar winding, two main field poles 2, 2' provided with a normal shunt field winding 3, 3', and two pairs of supplementary poles 4, 4' and 4a, 4'a.

The two poles 4, 4', acting as commutating poles, carry a winding 11, 11' connected to two brushes 6, 6' suitably shifted with respect to the main poles and to the supplementary poles, winding 11, 11' being traversed by the current delivered by the exciter-generator and feeding the field winding 19 of the main direct current machine 17. Supplementary poles 4a, 4'a, carry a field winding 12, 12', fed by the secondary winding 13 of an air-gap transformer 14, the primary winding 15 of which is traversed by the variable current delivered by the main generator 17.

In these exciter-generators all of the usual equipment such as a rheostat 8, a regulator 9 of any suitable type, a special relay or regulator 10 of the type known as "impulse relay" or "impulse regulator," and the like, may be connected in the main field circuit.

These machines may in addition comprise, if desired, a series excitation winding, one or more separate excitation windings fed by one or more external sources, and a winding for compensating for the armature reaction, while the number of poles utilized may be any desired even number.

Changes in or modifications to the above described illustrative embodiments of my invention may now occur to those skilled in the art without departing from my inventive concept and reference should be had to the appended claims to determine the scope of my invention.

What is claimed is:

1. Direct current exciter-generators, comprising, an armature, main field poles, at least one field winding for said main field poles, said winding being traversed by current of normal excitation other than a series excitation, a commutator, main brushes on said commutator at substantially right angles to the axis of said main poles, an even number of supplementary poles interposed between said main poles, at least one winding on said supplementary poles, said winding being traversed by the current delivered by the exciter-generator, a direct current generator excited by said exciter-generator, a main field winding for said direct current generator, a connection between said winding on said supplementary poles and said last named main field winding, a second main field winding for said excited machine, at least one auxiliary brush engaging said commutator between said main brushes and connected to said second main field winding, and a negative mutual inductance mutually compensating the mutual induction between said two main field windings.

2. In a direct current exciter-generator as described in claim 1, a single auxiliary brush connected to one end of said main field winding of said direct current generator excited by said exciter-generator, the other end of said field winding being connected to one of the main terminals of said exciter-generator.

3. In a direct current exciter-generator as described in claim 1, an even number of auxiliary brushes, the brushes of each polarity being connected respectively to an end of said main field winding of said direct current generator which is excited by said exciter-generator.

4. In an exciter-generator as described in claim 3, additional windings on said supplementary poles fed by suitable external sources to control the flux issuing from said supplementary poles and to control the terminal voltage of said main generator to obtain a rapid response machine.

5. In a rapid response exciter-generator as described in claim 4, an air-gap transformer having primary and secondary windings, means connecting said secondary winding to one of said additional windings on said supplementary poles and connections betwen the primary winding and said main direct current generator whereby said primary windings are traversed by the current delivered by the main direct current generator, whereby variations of the current delivered by the main direct current generator and resulting from load variations induce in said secondary winding a transient current which is supplied to said additional winding to transiently but rapidly increase or decrease the excitation and consequently the terminal voltage of said main generator.

6. Rapid response, direct current exciter-generator, comprising an armature, main field poles, at least one field winding for said main field poles, said winding being of the usual shunt type for a shunt wound machine, a commutator, an even number of brushes on said commutator at an angle to the geometrical axis of said main poles, commutating poles, a winding on said commutating poles traversed by the current delivered by said exciter-generator, a direct current generator excited by said exciter-generator, a main field winding for said direct current generator connected to said exciter-generator, an even number of supplementary poles interposed between said main poles and said commutating poles, at least one winding on said supplementary poles, an air-gap transformer, primary and secondary windings for said transformer said secondary winding being connected to said winding on said supplementary poles and said primary winding being connected to receive current from said direct current generator, the transient variations of said current which result from sudden load variations inducing in said secondary winding a transient current which is supplied to said winding on said supplementary poles thus, transiently but rapidly increasing or decreasing the excitation and consequently the terminal voltage of said exciter-generator.

7. Direct current exciter-generators, comprising main field poles provided with at least one usual field winding, said winding being traversed by a current of normal excitation other than a series excitation, a normal armature, a commutator and main brushes lying on said commutator at an angle to the axis of said main poles, an even number of supplementary poles interposed between said main poles, a direct current generator excited by said exciter-generator, a transformer having primary and secondary windings, said supplementary poles carrying one winding traversed by the current delivered by the generator and at least one additional winding in closed circuit with the secondary of said transformer whose primary is traversed by the current delivered by said excited generator, and at least one auxiliary brush engaging the commutator between the main brushes and connected to said field winding of the main poles, whereby there is introduced into said winding, already traversed by the said normal excitation current, the stepped-up or stepped-down electromotive force created by the flux engendered by the magnetomotive force produced by the said windings of said supplementary poles in addition to the magnetomotive force which is required for compensating the armature reaction due to the current delivered by the generator.

8. Direct current exciter-generators as described in claim 7 in which said supplementary poles comprise two pairs of poles, the poles of each pair being disposed opposite each other across the armature, and interconnected windings on each pole of one of said pairs of poles connected to said secondary of said transformer.

9. Direct current exciter-generators as described in claim 7 including additional windings on said supplementary poles connected to field windings of said excited generator, auxiliary brushes on said commutator connected to other field windings on said excited generator, and a negative mutual inductance compensating the mutual induction of the circuits to the field windings.

ROLAND PIERRE LÉOPOLD MARIE DAVID.

REFERENCES CITED

The following references are of record in the file of this patent:

UNITED STATES PATENTS

| Number | Name | Date |
|---|---|---|
| 1,677,699 | Alexanderson | July 17, 1928 |
| 1,893,354 | Bergman | Jan. 3, 1933 |

FOREIGN PATENTS

| Number | Country | Date |
|---|---|---|
| 692,600 | France | Aug. 1, 1927 |